United States Patent
Hsu et al.

(10) Patent No.: US 10,265,796 B2
(45) Date of Patent: Apr. 23, 2019

(54) ADAPTIVELY CONTROLLED SHORT CIRCUITING DRAWN-ARC FASTENER WELDING

(75) Inventors: Christopher Hsu, Avon, OH (US); Jeffrey J. Krupp, Vermilion, OH (US); James W. Mumaw, Wadsworth, OH (US)

(73) Assignee: Nelson Stud Welding, Inc., Elyria, OH (US)

( * ) Notice: Subject to any disclaimer, the term of this patent is extended or adjusted under 35 U.S.C. 154(b) by 712 days.

(21) Appl. No.: 13/298,727

(22) Filed: Nov. 17, 2011

(65) Prior Publication Data

US 2013/0126498 A1    May 23, 2013

(51) Int. Cl.
  *B23K 9/00*   (2006.01)
  *B23K 9/10*   (2006.01)
  *B23K 9/20*   (2006.01)
  *B23K 35/02*  (2006.01)

(52) U.S. Cl.
  CPC .............. *B23K 9/201* (2013.01); *B23K 9/205* (2013.01); *B23K 9/207* (2013.01); *B23K 35/0288* (2013.01)

(58) Field of Classification Search
  CPC .... B23K 35/0288; B23K 9/095; B23K 9/207; B24K 9/205
  USPC ........ 219/127–130.51, 53–55, 57–61, 97–98
  See application file for complete search history.

(56) References Cited

U.S. PATENT DOCUMENTS

| | | | |
|---|---|---|---|
| 2,268,416 A * | 12/1941 | Nelson | 219/98 |
| 4,085,307 A | 4/1978 | Jenkins | |
| 4,441,012 A * | 4/1984 | Risbeck et al. | 219/137 R |
| 4,681,998 A * | 7/1987 | Kon | 219/99 |
| 5,070,226 A * | 12/1991 | Raycher et al. | 219/98 |
| 5,981,896 A | 11/1999 | Keanini et al. | |
| 6,025,573 A * | 2/2000 | Stava | 219/130.21 |
| 6,077,096 A | 6/2000 | Moring et al. | |
| 6,271,500 B1 | 8/2001 | Hirayama et al. | |

(Continued)

FOREIGN PATENT DOCUMENTS

| EP | 0658396 A1 | 6/1995 |
|---|---|---|
| EP | 1750885 A2 | 2/2007 |

OTHER PUBLICATIONS

Welding Metallurgy, Austenitic Stainless Steels, Oct. 2004 (retrieved Jan. 17, 2013 from Internet: URL <http://www.gowelding.com/met/index.htm>), entire document.

(Continued)

*Primary Examiner* — Sang Y Paik (57) ABSTRACT

In one aspect, there is disclosed a drawn arc fastener welding process that includes the steps of providing a fastener positioned in a welding tool, providing a weld control, providing a work piece, contacting the fastener against the work piece, energizing a pilot current, lifting the fastener from the work piece and drawing a pilot arc, energizing a main arc for a predetermined duration, short circuiting the fastener relative to the work piece, cyclically redrawing an arc and short circuiting the fastener relative to the work piece at least one additional cycle, dynamically sensing an arc voltage and calculating a derivative signal of the voltage over time for each drawn arc and short circuit of the cycle wherein a position and motion of the fastener relative to the work piece is controlled and the energizing of the arc is controlled, and plunging the fastener into the work piece forming a weld.

34 Claims, 6 Drawing Sheets

(56) References Cited

U.S. PATENT DOCUMENTS

| | | | |
|---|---|---|---|
| 6,660,958 B2 | 12/2003 | Kurz et al. | |
| 6,744,012 B2 | 6/2004 | Ueda et al. | |
| 6,815,631 B2* | 11/2004 | Schmitt et al. | 219/99 |
| 7,102,099 B2* | 9/2006 | Huismann et al. | 219/130.51 |
| 7,301,119 B2 | 11/2007 | Schmidt et al. | |
| 7,345,860 B2 | 3/2008 | Wong | |
| 7,452,171 B2* | 11/2008 | Albrecht et al. | 411/171 |
| 2008/0006613 A1 | 1/2008 | Ulrich et al. | |
| 2009/0026188 A1 | 1/2009 | Schorghuber | |
| 2010/0079186 A1* | 4/2010 | Zannoth et al. | 327/333 |
| 2010/0176104 A1 | 7/2010 | Peters et al. | |
| 2010/0224608 A1* | 9/2010 | Aimi et al. | 219/130.33 |
| 2010/0230389 A1 | 9/2010 | Hsu et al. | |
| 2011/0187566 A1* | 8/2011 | Soenen et al. | 341/110 |
| 2012/0234803 A1* | 9/2012 | Liu et al. | 219/121.54 |

OTHER PUBLICATIONS

ISR from PCT/US2012/065552 dated Feb. 8, 2013 (4 pages).

* cited by examiner

ADAPTIVELY CONTROLLED SHORT CIRCUITING DRAWN-ARC FASTENER WELDING

FIELD OF THE INVENTION

The invention relates to drawn arc fastener welding and particularly to drawn arc fastener welding including an adaptively controlled short circuiting.

BACKGROUND OF THE INVENTION

Drawn arc fastener or stud welding generally includes the shorting of a stud or fastener to the work piece followed by passing a small pilot current into the short circuit followed by lifting of the stud or fastener from the work piece and drawing a pilot arc plasma. Next, the arc current is increased to a higher main arc current melting the weld end of the fastener and the work piece followed by plunging of the fastener into the work piece forming a weld.

The arc energy or heat input delivered by such a process must match with the stud diameter and base metal thickness and must take into account the heat sinking properties of the materials. Too little or too great of a heat input may cause excessive or insufficient melting forming a poor weld. Drawn arc welding typically requires a ceramic ferrule about the stud weld base to weld fasteners on plate material and is generally a fast process done in less than 1 second which may result in a very fast cooling rate. Short cycle or short time stud welding process typically does not require a ferrule and is done in less than 100 ms typically for welding fasteners on thin sheet metals. In some applications, a desired or optimum heat suitable for melting may not be suitable for weld metallurgy. For example, conventional drawn-arc stud welding on MIL-A 46100 armor plate with 0.64 carbon equivalent and NORSOK M-120 offshore structural plate with 0.42 carbon equivalent without preheat will result in brittle microstructure and poor ductility. In another example, drawn arc welding a ⅝" diameter carbon steel fastener to a lean duplex stainless steel workpiece in 700 millisecond may cause martensitic microstructure in the weld causing a brittle weld that may be prone to failure. Preheating or slower welding processes such as SMAW or GMAW process are known and can reduce the cooling rate but at a longer fabrication time and larger labor cost.

There is therefore a need in the art for a cost-effective method of slowing down the cooling rate to achieve a more ductile or desired microstructure.

Efforts to slow down a cooling rate include increasing a heat input through increasing the main arc current and time. However, excessive current and time may cause process instability and result in excessive stud or fastener burn off, base metal melt through, and lateral expulsion. When utilizing such a technique, molten liquid accumulates at the weld end of the fastener or stud during welding and requires an extreme lift to avoid the accumulated liquid at the stud end from bridging to the molten puddle in the workpiece thereby extinguishing the arc. However, extreme lift or extreme arc length may result in higher susceptibility to arc blow and uneven melting of the stud.

There is therefore a need in the art for an improved arc welding process that adds a controllability of the process forming a stable welding process in which more heat can be delivered in a controlled manner. There is also a need in the art for a process in which the heat can be delivered slowly over a significantly longer weld time slowing the cooling rate of the drawn arc fastener welding process independent of the total heat input.

Drawn arc fastener welding in an underwater environment and heat sinking capacity result in rapid cooling of the weld and heat affected zone and in a localized quenching of the materials. The quenching may increase the hardness in both the weld and heat affected zone. Such quenching may result in brittleness of the stud weld. Additionally wet welding has excessive hydrogen dissolved in the weld pool and fast welding time and rapid freezing can trap the hydrogen bubbles causing increased porosity in a weld. There is therefore a need in the art for a process that may be utilized in underwater welding to increase a weld time and slow down a cooling rate to lower the hardness and porosity of a formed weld.

Drawn arc fastener welding may be performed on a coated work piece such as a galvanized beam or zinc coated work piece or a fastener that may be zinc coated or galvanized. Zinc may be utilized for corrosion resistance but has a detrimental effect on a weld. Generally, to avoid weld contamination the zinc must be removed from the galvanized work piece prior to a welding by grinding or other such labor-intensive methods. Additionally, fasteners or studs that include a zinc coating must be manufactured such that the weld end of the fastener does not include the zinc coating, adding to an overall cost of the stud. Generally, zinc has a low boiling temperature and may be vaporized if sufficient time is provided in a heated condition. However, conventional or typical drawn arc welding has a time that is too fast to vaporize the zinc material in the weld zone. There is therefore a need in the art for an improved process that increases a weld time and maintains a stable welding process that vaporizes surface zinc and other contaminations such as surface oxides and moisture.

Generally, drawn arc fastener welding for larger diameter fasteners requires a very high output power source such as greater than 1500 or 2000 amps. Larger power sources require higher current service line powers and larger generators. There is therefore a need in the art for a process that utilizes a smaller power source and utilizes a fraction of the welding current with an increase of the time for the weld to deliver an equivalent heat input for melting a larger fastener.

SUMMARY OF THE INVENTION

In one aspect, there is disclosed a drawn arc fastener welding process that includes the steps of providing a fastener positioned in a welding tool, providing a weld control, providing a work piece, contacting the fastener against the work piece, energizing a pilot current, lifting the fastener from the work piece and drawing a pilot arc, energizing a main arc current for a predetermined duration, short circuiting the fastener to molten weld pool in the work piece, cyclically redrawing an arc and short circuiting the fastener to the weld pool in the work piece at least one additional cycle, dynamically sensing an arc voltage and calculating a derivative signal of the arc voltage over time for each drawn arc and short circuit of the cycle wherein a position and motion of the fastener relative to the weld pool in the work piece is adaptively controlled and the energizing of the arc is controlled, and plunging the fastener into the work piece forming a weld.

In another aspect, there is disclosed a drawn arc fastener welding process that includes the steps of providing a fastener positioned in a welding tool, providing a weld control, providing a work piece, contacting the fastener against the work piece, energizing a pilot current, lifting the fastener from the work piece and drawing a pilot arc, energizing a main arc current for a predetermined duration, short circuiting the fastener to weld pool in the work piece, cyclically redrawing an arc and short circuiting the fastener relative to the work piece at least one additional cycle wherein the step of cyclically redrawing an arc and short circuiting includes reducing an arc current to a value less than the main arc current prior to short circuiting and increasing the reduced arc current to the main arc current following the lifting of the fastener away from the weld pool in the workpiece out of the short circuit, dynamically sensing an arc voltage and calculating a derivative signal of the arc voltage over time for each drawn arc and short circuit of the cycle wherein a position and motion of the fastener relative to the weld pool in the work piece is controlled and the energizing of the arc is controlled, and plunging the fastener into the work piece forming a weld.

DETAILED DESCRIPTION OF THE PREFERRED EMBODIMENTS

Referring to FIG. 1, there is shown a diagram including the steps of a drawn arc fastener welding process that includes providing a fastener positioned in a welding tool, providing a weld control, providing a work piece, contacting the fastener against the work piece, energizing a pilot current, lifting the fastener from the work piece and drawing a pilot arc, energizing a main arc current for a predetermined duration, short circuiting the fastener to weld pool in the work piece, cyclically redrawing an arc and short circuiting the fastener relative to the weld pool of the work piece at least one additional cycle, dynamically sensing an arc voltage and calculating a derivative signal of the arc voltage over time for each drawn arc and short circuit of the cycle wherein a position and motion of the fastener to weld pool in the work piece is controlled and the energizing of the arc is controlled, and plunging the fastener into the work piece forming a weld.

Figure 1A:
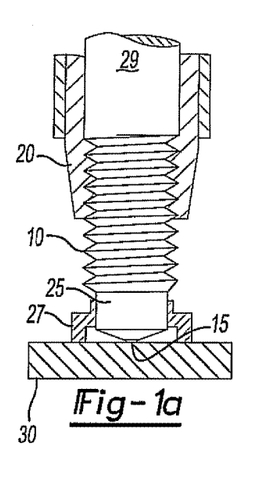
FIG. 1 is a flow diagram detailing the steps of the invention including the welding tool, work piece, and movement of the fastener relative to the work piece.
Figure 1B:
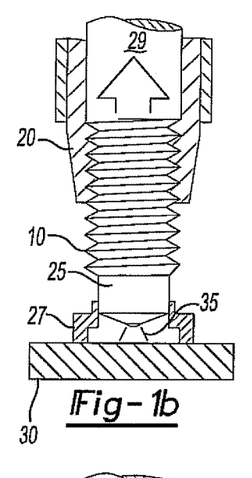
Figure 1C:
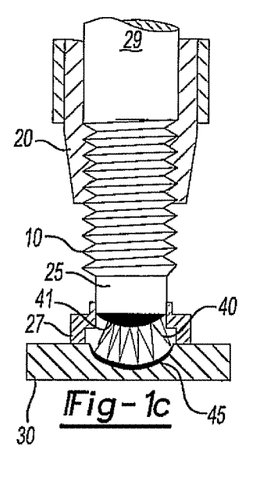

Referring to FIG. 1A, there is shown a threaded fastener or stud 10 that includes an aluminum flux load 15 held by a chuck 20. The stud weld base or weld end 25 is surrounded by a ceramic ferrule 27 that may be held down by a foot which is not shown. A weld tool 29 holds the chuck 20 which in turn holds the fastener or stud 10 against a work piece 30 and passes a small pilot current, for example 15 amps, through an electrical contact between the fastener 10 and work piece 30. The welding tool 29 lifts up the stud 10 in FIG. 1B and draws a small pilot arc 35 between the stud 10 and work piece 30. The arc current is then increased to a higher or peak level forming a main arc 40 as shown in FIG. 1C. The main arc 40 creates melted liquid 41 at the bottom of the stud 10 and in the work piece 30. A small weld pool crater or depression 45 is formed in the work piece 30 from the arc pressure of the main arc 40. Following the formation of the main arc 40, the current is reduced to a lower background level 43 in step D. The crater 45 in the work piece 30 collapses due to the reduced arc force applied to its surface and the liquid in the weld pool 47 moves about the stud 10 but is contained by the ferrule 27 as a dam and the weld pool 47 surface may have ripples. Following the reduction in the weld current, the weld tool plunges the stud 10 towards the work piece 30 in step E and creates a bridge of liquid 48 and spatter 49 at the onset of the bridging. The spatter level is reduced due to the reduced current before the bridging. The bridging transfers liquid from the stud 10 to the weld pool 47 in the work piece 30 due to surface tension and gravity. In another aspect, the reduction of current alone causes the weld pool depression 45 to bounce up and forms a liquid bridge 48 to the stud 10 without the plunge action. The weld control monitors the arc voltage and calculates a derivative of the arc voltage with monitoring for a negative derivative value of the arc voltage, for example −100 volts per millisecond, signifying the bridge event and stops the plunge action immediately and maintains the plunge position dynamically to avoid over plunge or stubbing out. In one aspect, the derivative value of the arc voltage over time may be a high pass filter that is combined with a low pass filter or smoothing to overcome noises within the process described below.

Figure 1D:
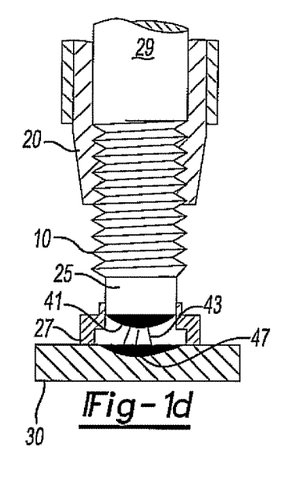
Figure 1E:
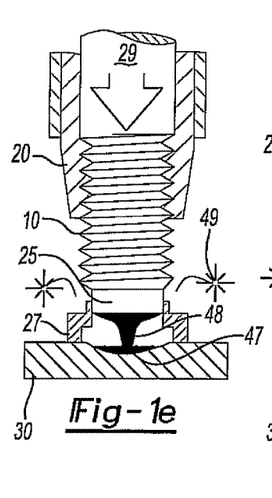

Arc voltage threshold level can also be used to detect the transition between arc and short, however it is at a disadvantage due to several practical concerns in drawn-arc welding. One is that noise in the voltage measurement, where the sources of the noise can come from inverter power source switching and other EMI broadcasting devices in the vicinity. Another is accidental or transitory bridging of the liquid hanging 41 under the stud and the rippled weld pool 47 surface. The liquid accumulation 41 dangling at the end of the stud 10 in FIG. 1D is unpredictable in quantity and geometry due to the long arc time (>100 ms) melting of the stud and can be detached by gravity together with pinch force of current density in a phenomenon known as globular transfer. The rippled or bouncing weld pool 47 surface and the dangling liquid 41 from the stud 10 may accidentally touch each other. The touch or short immediately breaks away without transferring much volume of liquid from the stud 10 to the work piece 30 due to the movement of the liquid on either the stud 10 side or the weld pool 47 side. This effect adds noise in the voltage sensing because one need to detect a legitimate short or a wide-enough bridge where substantial and dependable amount of liquid accumulated at the stud is transferred to the workpiece at each short circuit, to ensure process rhythm and stability. A third problem is that the voltage measurement often includes the weld cable and connectors voltage drop making the threshold level between arc and short dependent on the cable length and temperature, number of connectors in the weld circuit, and the welding current passing through the cables and connectors. Although it is possible to use separate voltage sense cables, they are fragile and not practical in construction site with over 130 meters of weld cable extensions, with 5-8 interconnections. In drawn-arc welding, the filtered derivative method makes it possible to measure the arc voltage at the output terminals of the welding power source with reliable detection of a legitimate arc to short transition and vice versa with substantial and dependable liquid transfer independent of the resistance of the weld circuit from weld cables and connectors.

As stated above, the process includes cyclically redrawing an arc and short circuiting the fastener 10 relative to the weld pool 47 of the work piece 30 for at least one additional cycle. In practice, a plurality of cycles may be performed to apply a desired heat between a fastener 10 and work piece 30 and achieve a desired cooling rate. A transition between a short and arc and vice versa is analogous to an edge detection in digital image processing. Various edge detection digital filters may be utilized to reliably detect the transition between the arc and short. In one aspect, thresholds of the first derivative of arc voltage are used. In another aspect, zero crossings of the second derivative are used. A high pass filter can also be used in lieu of derivatives for edge detection. The arc voltage signal may be conditioned by a low pass digital filter such as second order Butterworth filter prior to taking the derivatives. The sampling of the arc voltage can be synchronized with the inverter switching to minimize inverter power source switching noise. In practice, the low pass filter and derivatives or high pass edge detection calculation or transfer function can be combined in a single digital filter in Z-domain.

Figure 1F:
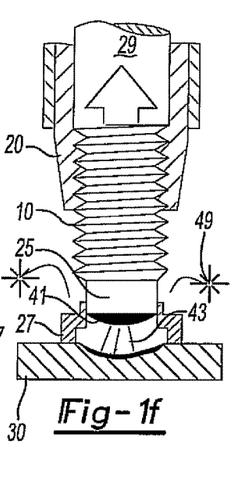
Figure 1G:
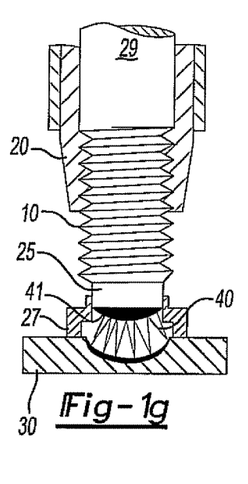
Figure 1H:
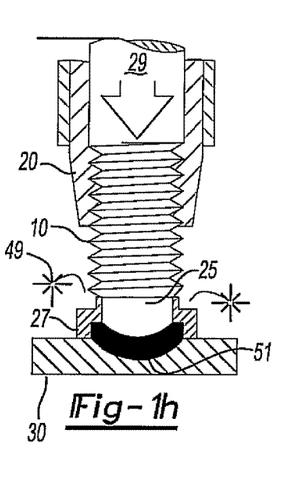

Following the cyclical plunging step and short circuiting, the weld tool then lifts the stud 10 as shown in FIG. 1F and the control monitors for a positive derivative threshold value of the arc voltage over time (dv/dt), for example 100 volts per millisecond, signifying that the bridge 48 has been broken and stops the lift immediately maintaining the lift position dynamically. The bridge breaking creates spatter 49. The spatter 49 is less due to the low background current during the break. After the liquid bridge 48 has been broken, the current is then increased to the main arc current 40 or peak level as shown in step G. As stated above, steps D-G may then be repeated various numbers of cycles until a desired weld time and heat input are achieved. Following the cyclical steps of D-G, a final step as shown in H includes plunging the fastener 10 into the work piece 30 and reducing the current to zero forming a weld 51 between the fastener 10 and work piece 30.

Following formation of the weld, the ferrule 27 may be removed from the work piece 30. In one aspect, the ferrule 27, as stated above, may be secured to the work piece by a foot that includes a gas diffuser that supplies gas to the weld zone. The gas may include inert gases as well as other types of gases that may be utilized in the welding operation. Additionally, as stated above, the fastener 10 may include a flux load 15 positioned on the weld end 25 of the fastener 10 if shielding gas is not used. The flux load 15 may be of a greater amount than utilized in conventional drawn arc welding due to the longer welding time.

Figure 2:
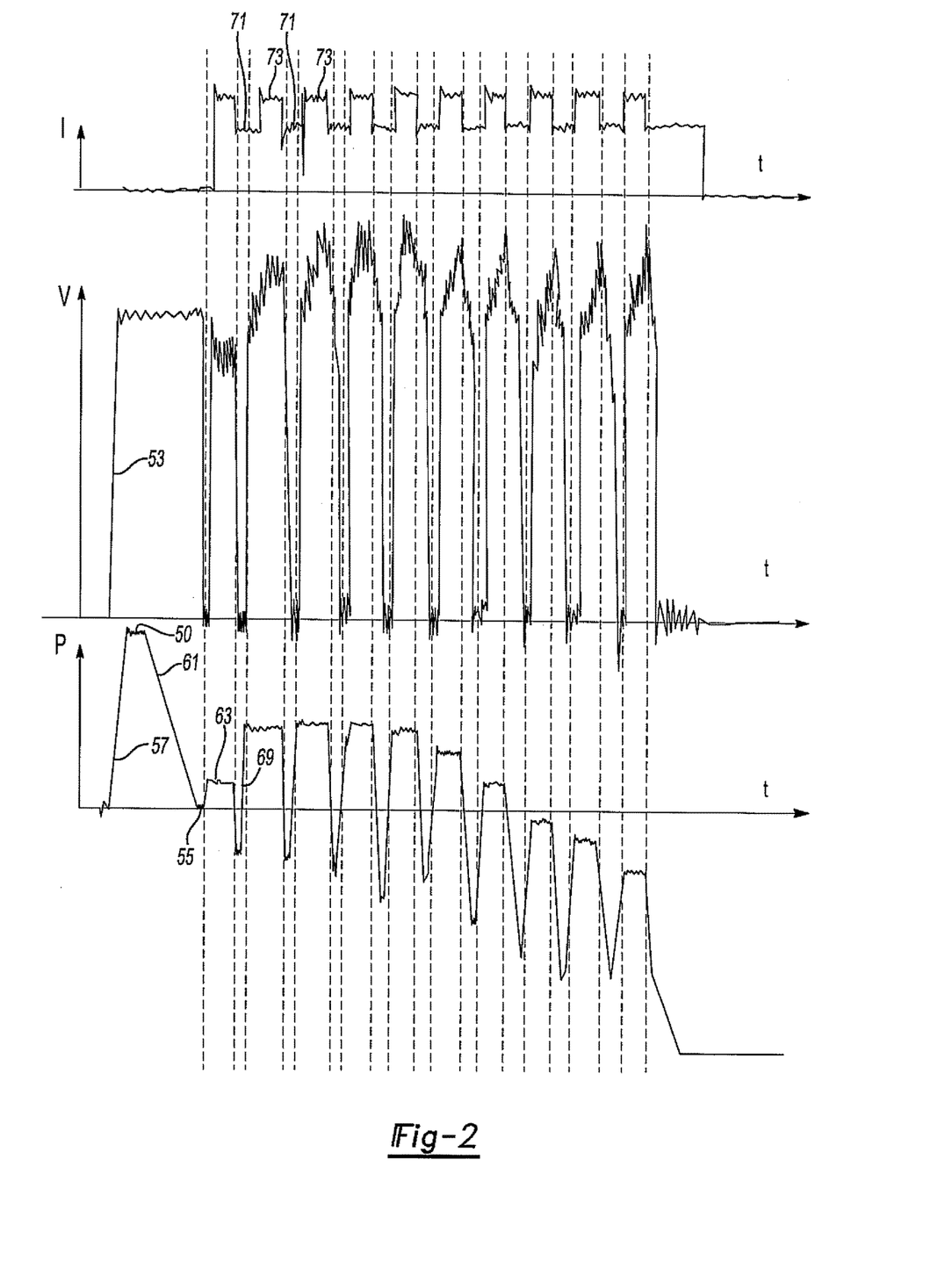
FIG. 2 is a plot of the current, voltage, and position of a stud for a 9½ millimeter diameter threaded stud utilizing the process of the present invention.

Referring to FIG. 2, there is shown a diagram of the stud or fastener welding signals including a plot of the current, voltage, and position of a stud over time. In one aspect, the arc voltage may be sensed between the chuck 20 and a ground clamp of the work piece 30 and the stud 10 position may be measured by an LVDT type sensor.

In one aspect, the power source may output a stud detection voltage of, for example, 34 volts as shown at 53 in FIG. 2. The weld tool 29 moves the stud 10 upwards at 57 until it reaches a home position 50 and dwells at the home position 50. The stud 10 then descends at 61 to a zero position 55 by sensing a touch resulting in a sharp voltage reduction as shown. At the zero position 55 the fastener or stud is shorted to the work piece 30 and the power source outputs a pilot current, for example 15 amps. The motor of the weld tool 29 then lifts at 63 the stud 10 off the work piece 30 drawing a pilot arc 35. The power source may monitor the arc voltage such that if an arc is not detected after the lift the welding sequence is aborted for failing to establish a pilot arc 35. The power source upon detection of the pilot arc outputs a much higher current for the main arc 40 such as, for example, 500 amps for a duration of 100 milliseconds or greater thereby melting the weld end 25 of the stud 10 and the work piece 30. The power source then reduces the current to a low background level 43 of, for example, 300 amps and begins to plunge the fastener or stud 10 into the work piece 30 weld pool 48 while monitoring an arc voltage and calculating a filtered derivative value. When the filtered derivative value reaches a predetermined threshold level such as, for example, below −100 volts per millisecond. The reduction of the current prior to the plunging reduces spatter because the short circuiting or bridging event takes place at a lower current level. As stated above, the short detection can be accomplished by monitoring the arc voltage and passing the data to a digital filter for edge detection corresponding to a derivative value of the voltage. Immediately following detection of the short, the motor lifts at 69 the stud 10 until an arc is detected by monitoring the arc voltage and again a calculated filtered derivative value of the arc voltage over time. Detection of the formation of the arc may be achieved when the derivative value is greater than 100 volts per millisecond. Alternatively, the lifting of the fastener or stud 10 may take place after a predetermined delay such as from greater than 0.1 milliseconds to 5 milliseconds. In one aspect the delay is kept to a short duration to avoid freezing of the weld. Transitioning from the short circuit 71 to the arc 73 at a lower background current 43 additionally reduces weld spatter. If an arc is not detected for a given time, the welding sequence may be aborted for failing to reestablish the arc. If an open circuit voltage (OCV) is detected, the arc is lost, and the welding sequence control may react by plunging again to short circuit and then re-lifting or re-drawing the arc. Once reestablishment of the arc has been detected, the power source may increase the welding current to the peak or main current level of 500 amps and keep the arc duration for 100 milliseconds or greater. The short circuit phase 71 and arc phase 73 alternate and repeat for nine times as shown in the figure and a motor of the weld tool 29 plunges the stud or fastener 10 towards the work piece 30 for a final time at a reduced speed towards the preprogrammed plunge depth. The arc voltage is monitored to detect a final short and then the output current is stopped or reduced to zero. If a short is not detected, the arc current is maintained to prevent a cold plunge. In one aspect, the overall welding time of the main arc is 2 seconds with a first peak pulse with a repeated sequence of additional pulses. It can be seen from the position shown in the figure that the average stud position is gradually lowered due to the gradual melting of the stud or fastener 10 resulting in a gradual stud length reduction after each short circuit. The total fastener length reduction or burn off after welding for the shown operation is approximately 13 millimeters. Upon formation of the weld, the welded stud or fastener 10 may be bent 90 degrees without fracture. The welding operation is preferably conducted utilizing a protective shielding gas having a composition of 90% argon and 10% carbon dioxide. Shielding gas may be utilized in the process of the present invention to prevent oxidation and also reduce the amount of flux utilized to expel oxygen. As stated previously, an oversized ceramic ferrule 27 with large cavity and vents may be utilized to accommodate the extra weld flash around the stud base from extra stud length burn off. Alternatively, a larger flux material may be utilized as an oxygen scavenger such that a two or three times larger than normal size flux may be utilized to accommodate a longer welding time of more than 1 second and, as shown in a specific example, 2 seconds.

As is shown in the diagrams of FIG. 2, it is difficult to forecast and control the stud positions to specific values or absolute values that are predetermined. The dynamic monitoring and control including the calculation of a derivative signal of the arc voltage over time for each drawn arc and short circuit of the cycle provides a reliable method to detect a transition between the arc phases 73 and short circuiting phases 71 such that the process includes adaptively and dynamically terminating the plunging action and lifting action to prevent an open circuit voltage arc loss and freezing of the weld puddle. It can be seen that the adaptive control resulted in a relatively constant lift position in the first 3 lifts, but a gradual lowering of the lift position in the remaining 6 lifts. This is probably because the weld pool size is being established and balanced by the stud length burn-off in the first 3 lifts. The remaining 6 lifts or cycles are dominated by the stud length reduction and transferring the melted stud liquid to the weld pool during each short circuit, necessitating a progressively lower lift positions to maintain stable arc length in each lift. The plunge positions do not have predictable behavior. The first 4 plunge positions have a declining trend, while the 5th lift reverse direction and goes higher than the 4th plunge, and the remaining 3 plunges continue the decline trend, while the 9th plunge is the same as the $8^{th}$. The plunge position, or the short circuit position, depends on liquid shape hanging on the bottom of the stud, and the surface height of the weld pool, which is confined by the ceramic ferrule and may have ripples and is hard to predict. The complex fluid dynamics and arc physics in a long time drawn-arc process (100 ms+) are hard to forecast and pre-program ahead of time. Adaptive sensing of arc and short transition with dv/dt and adaptive control of the stud motion are far more effective than using specific lift and plunge values or positions pre-programmed. If the specific lift value is too high, it is possible to lose the arc and go to OCV and the weld sequence may have to be prematurely terminated causing bad weld. If the specific plunge value is too high, it is possible to stub out and the molten puddle may freeze and solidify, making it impossible to lift again. It is difficult also to forecast the crater size in FIG. 1C and its rebound in FIG. 1D, as a result difficult to forecast and pre-determine specific plunge positions, especially as the welding progresses from a small crater at the beginning and grows to a bigger crater at the end. The freezing is more likely to happen during the very first cycles because the puddle is relatively small in size, the workpiece is cold and is sinking the heat very fast, and the small puddle does not have enough thermal inertia.

Figure 3A:
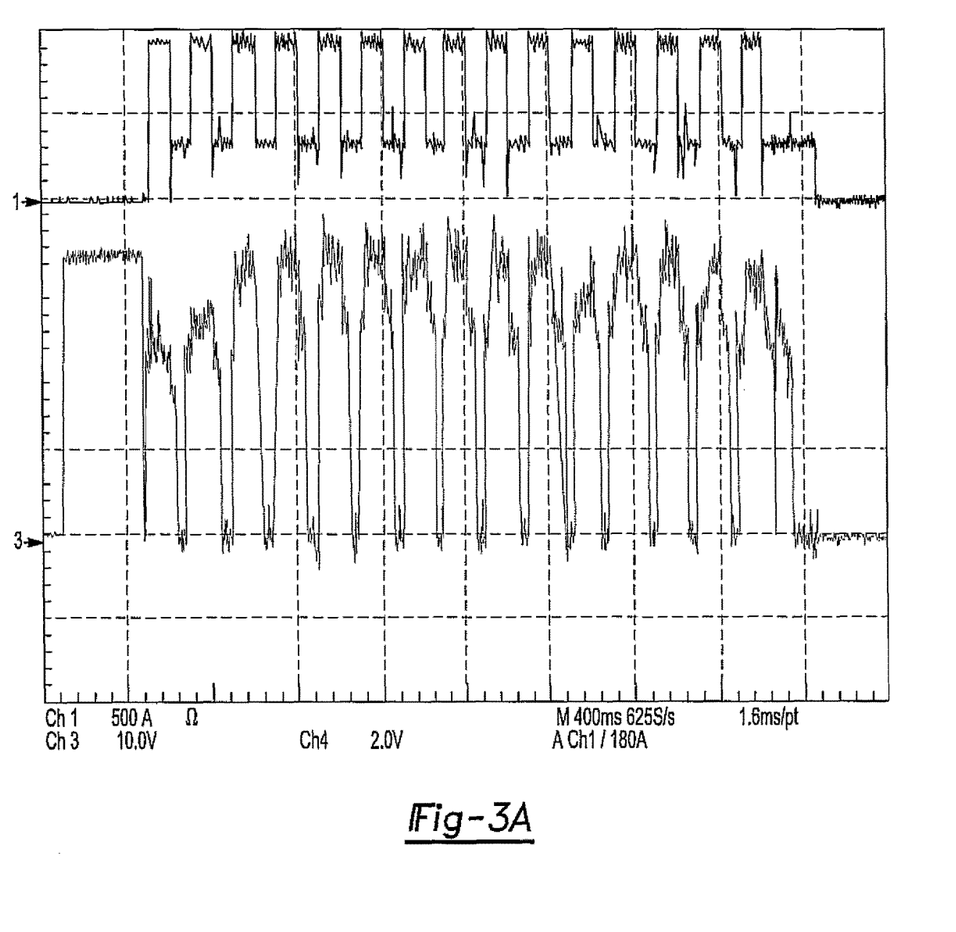
FIG. 3 is a plot of the current, voltage, and position of a stud over time for a 16 millimeter stud having a 3 second overall weld time utilizing a 1200 amp peak current and 100 millisecond peak time with a 350 amp background current with 15 pulses.
Figure 3B:
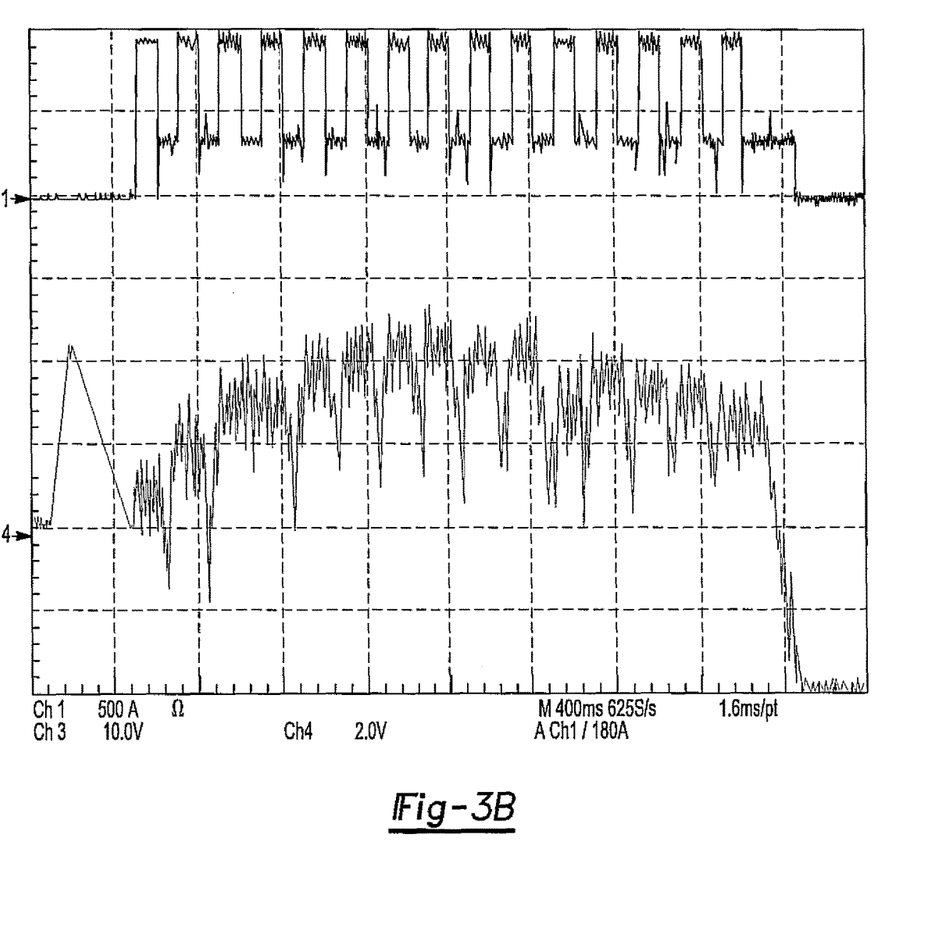

Referring to FIGS. 3A and B, process signals of a welding operation including a 16 millimeter stud having an overall weld time of 3 seconds are shown. For the 16 millimeter diameter stud a welding procedure includes utilizing a 1200 amp peak or main current and 100 millisecond peak time with a 350 amp background current. Fifteen pulses between the short circuiting and drawn arc with an overall weld time of 3 seconds of main arc time produce a weld having excellent weld mechanical and metallurgical properties.

Figure 4:
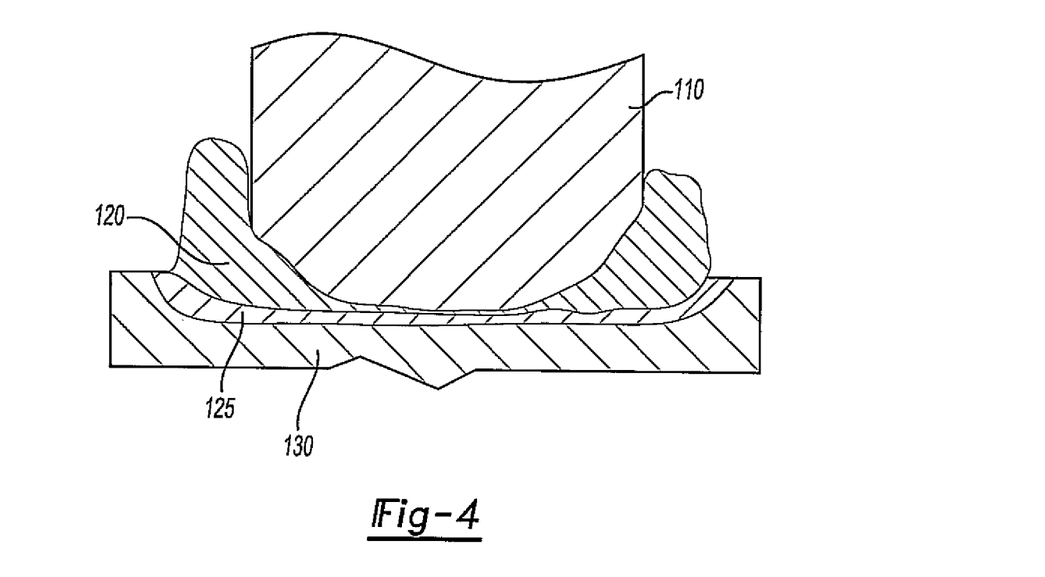
FIG. 4 is a partial sectional view of a weld formed using a conventional or typical drawn arc welding process for a 16 millimeter diameter stud on a high carbon content base material such as NORSOK M-120.

In the figures, channel 1 is a welding current on the top half of the oscilloscope chart, channel 3 is the arc voltage and channel 4 is the stud position. As can be seen in channel 4, the overall envelope of the lift position has a bell curve such that it gradually increases and then goes down as the welding process progresses. This bell shape indicates that an adaptively and dynamically controlled lift and plunge position governed by a filtered derivative value of the arc voltage over time provides a stable and successful welding process for welding durations of main arc time of greater than 100 milliseconds. Additionally, as stated above, various parameters such as movement of the liquid metal within a ferrule require specific lift and plunge positions that need to be calculated and dynamically controlled over the cyclical shorting and arc forming steps, and difficult or nearly improbable to be pre-determined specific values in programming Referring to FIG. 4, there is shown a cross section of a weld formed between a fastener 110 and work piece 130 using a conventional drawn arc welding process. In the figure, the work piece or base material 130 may be formed of a hard material such as NORSOK M-120. As shown in FIG. 4, the conventional drawn arc welding of a 16 millimeter diameter stud 110 may utilize a main arc of 1200 amps and have a 700 millisecond duration resulting in the cross section shown. The stud weld cast zone 120, heat affected zone 125, and base materials 130 are shown. The penetration of the stud 110 into the base metal 130 is low and a peak hardness of 395 HV10 next to the fusion line of the heat affected zone 125 in the immediate proximity to the weld zone 120 is measured.

Figure 5:
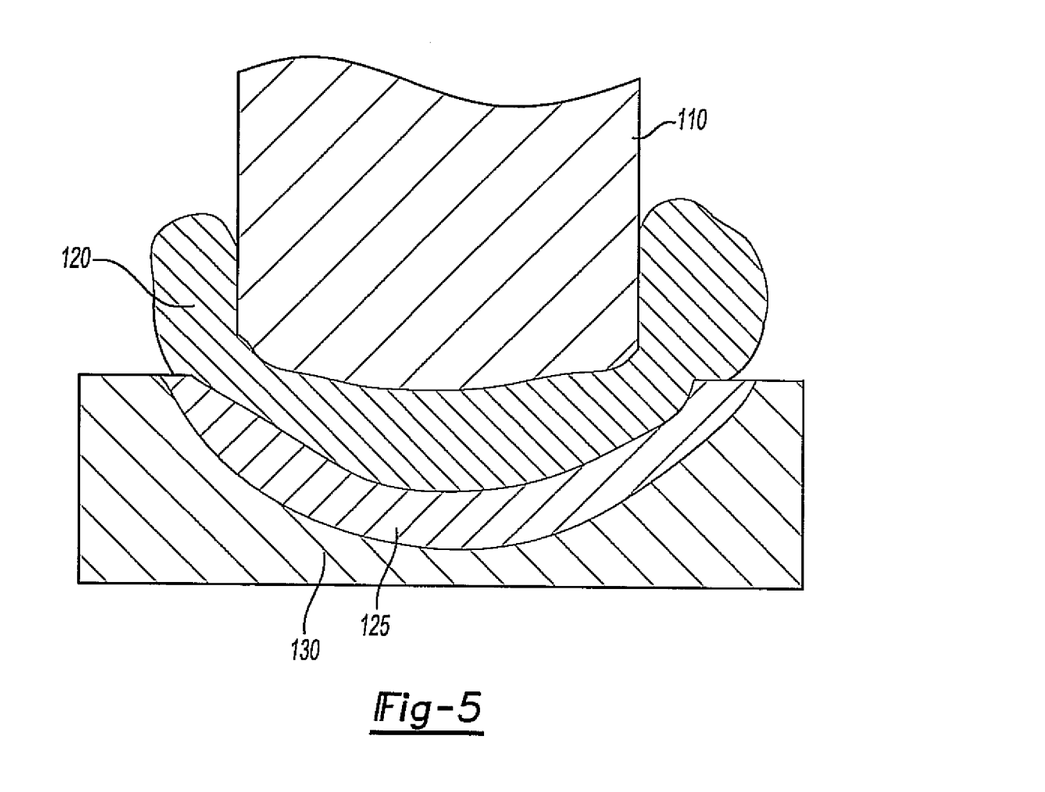
FIG. 5 is a partial cross-sectional view of the fastener and materials of FIG. 4 utilizing the drawn arc process of the present invention.

In contrast, referring to FIG. 5, the welding cross section of a 16 millimeter diameter stud 10 and a work piece 30 as described above is performed utilizing the procedure of the present invention. As can be seen in the figure, the stud 10, weld cast zone 120, heat affected zone 125, and base material or work piece 30 are shown. As can be seen in the figure, the introduction of more heat utilizing the process of the present invention results in deeper penetration of the stud 10 into the base material or work piece 30 and results in a slower cooling rate. The peak hardness is measured to be 346 HV10 which is below the conventional weld of 395 HV10 as stated above. This results in a more ductile weld that has improved strength and properties over a conventional drawn arc weld.

In one aspect, the drawn arc fastener welding process of the present invention may be utilized when welding fasteners or studs 10 to galvanized or zinc coated structural steel plate 30. The welding procedure outlined above for the 16 millimeter weld stud of FIG. 3 was performed when welding carbon steel studs to a zinc coated work piece. The spatter level was drastically reduced in comparison to conventional drawn arc welding procedures and the welds formed passed a 90 degree bend test consistently which is not the case for conventional drawn arc welding of similar materials. In one aspect, the longer welding times and controlled heat input allow the zinc material to be vaporized and sufficient time to escape the weld zone thereby improving the quality of the weld formed.

Figure 6:
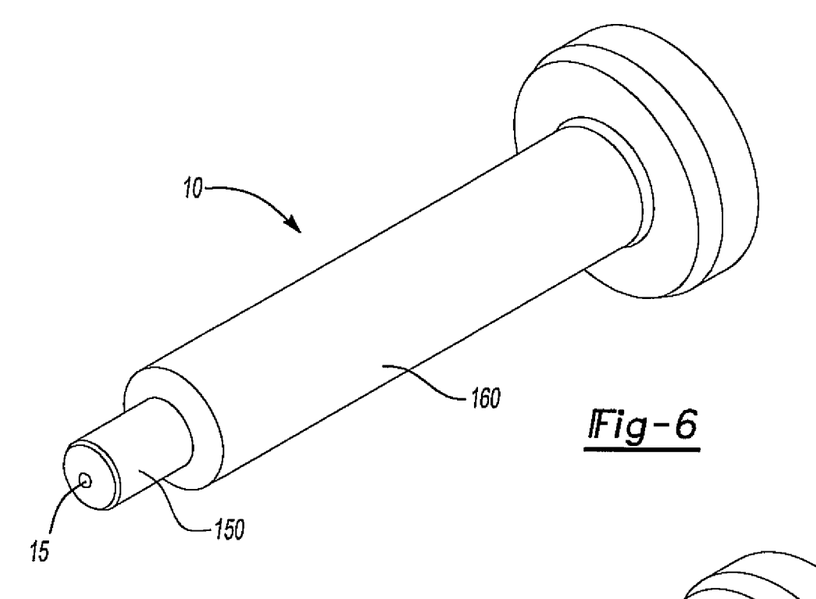
FIG. 6 is a perspective view of a stud or fastener having a reduced size weld end.

Referring to FIG. 6, there is shown an embodiment of a fastener or weld stud 10 that includes a reduced sized portion 150 at the end. In one aspect, the reduced sized portion 150 of the stud requires less current to melt in comparison to a larger diameter stud. For example, a 16 millimeter stud normally requires 1200 amps and 700 milliseconds to weld.

However, using a reduced diameter portion 150 such as a 9 millimeter reduced section in comparison to a 16 millimeter stud requires only 500 amps over a 2 second duration such that the same energy may be delivered to melt the stud 10 and work piece 30 at a lower current but over a longer time to consume the entire long length of 150. The present invention makes it possible to burn off a very long segment of stud without liquid bridge freezing terminating the welding process prematurely. Optionally, a higher current at the end of the main arc time prior to a final plunge may be utilized to enlarge the arc plasma and engulf the nominal larger portion 160 of the fastener or stud 10 and provide a robust joining of the stud 10 to the work piece 30.

In one aspect, the reduced sized portion 150 of the fastener or stud 10 may be formed of a different material. For example, the reduced sized portion 150 may be made of a different material such as silicon bronze so that a stud or fastener 10 can be brazed to a material having high carbon content without substantially melting the base material causing weld cracks.

Figure 7:
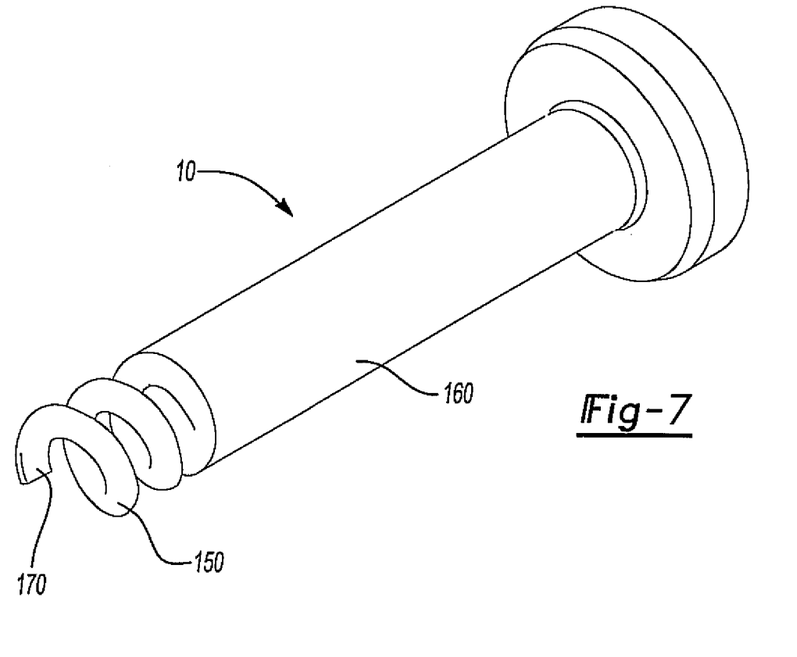
FIG. 7 is a perspective view of another embodiment of a stud or fastener having a weld end shaped as a corkscrew.

Referring to FIG. 7, there is shown another embodiment of a fastener or stud 10 having a reduced sized portion 150. In the depicted embodiment, the reduced sized portion 150 can be formed of a corkscrew-like formation 170. Such a formation may avoid using a very long and small diameter reduced sized portion 150 to supply the needed liquid metal, alloy addition and flux during a welding operation. In one aspect, a spiral-shaped wire may be attached at the bottom portion of the fastener or stud 10. The spiral-shaped wire may be formed of a flux cored self shielded arc welding (FCAW) tubular wire.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

We claim:

1. A drawn arc fastener welding process for welding a metal work fastener carried by welding tool to a work piece, the process comprising the steps of:
   contacting the work piece against the work piece;
   energizing a pilot current;
   lifting the fastener from the work piece and drawing a pilot arc;
   increasing the pilot current in order to form a main arc for a predetermined duration thereby forming a weld pool in the work piece and weld pool on the bottom of the fastener;
   short circuiting the fastener to the weld pool;
   cyclically redrawing an arc and short circuiting the fastener to the weld pool at least one additional cycle;
   dynamically sensing an arc voltage and calculating a time derivative signal of the arc voltage for each drawn arc and short circuit of the cycle in order to control the position of the fastener relative to the weld pool during lifting until a positive lift threshold of the time derivative of the arc voltage is reached and alternatively controlling the plunging until a negative plunge threshold of the time derivative of the arc voltage is reached; and
   lifting the fastener away from the weld pool to said position until the positive lift threshold of the time derivative of the arc voltage is reached;
   plunging the fastener toward the work piece from said position forming a weld until the negative plunge threshold of the time derivative of the arc voltage is reached.

2. The drawn arc fastener welding process of claim 1 wherein the step of cyclically redrawing an arc and short circuiting includes reducing an arc current to a value less than the main arc current preceding short circuiting.

3. The drawn arc fastener welding process of claim 2 including the step of increasing the reduced arc current to the main arc current in the short circuit after lifting of the fastener out of the short circuit to the weld pool in the work piece.

4. The drawn arc fastener welding process of claim 1 including positioning a ferrule about the fastener.

5. The drawn arc fastener welding process of claim 1 wherein a main arc duration is greater than 100 milliseconds.

6. The drawn arc fastener welding process of claim 4 wherein the ferrule is secured to the fastener by a foot that includes a gas diffuser supplying gas to a weld zone.

7. The drawn arc fastener welding process of claim 1 wherein the fastener includes a flux load positioned on a weld end of the fastener.

8. The drawn arc fastener welding process of claim 1 wherein the arc voltage is pre-conditioned by a digital low pass filter before the derivative is taken.

9. The drawn arc fastener welding process of claim 1 wherein the arc voltage is pre-conditioned by a low pass filter and time derivative implemented as a high pass filter, wherein both filters are combined into one digital filter in Z-domain.

10. The drawn arc fastener welding process of claim 1 wherein a total aggregated arc time and short circuit time exceeds 1.5 seconds.

11. The drawn arc fastener welding process of claim 1 wherein the short circuiting includes plunging the fastener towards the work piece.

12. The drawn arc fastener welding process of claim 11 wherein the plunging action is stopped as a function of the time derivative of the arc voltage.

13. The drawn arc fastener welding process of claim 1 wherein the short circuiting takes place due to liquid movement under the stud and the weld pool as a result of reducing current from peak to background without plunging the stud towards the weld pool.

14. The drawn arc fastener welding process of claim 1 further including the step of wherein the redrawing includes lifting the fastener away from the work piece.

15. The drawn arc fastener welding process of claim 14 further including the step of measuring the arc voltage and determining the time derivative of the arc voltage
   wherein the lift action is stopped as a function of the time derivative of the arc voltage.

16. The drawn arc fastener welding process of claim 14 wherein the lift action is stopped if open circuit voltage (OCV) is detected, or are lost, followed by a plunge and lift cycle to re-ignite the arc.

17. The drawn are fastener welding process of claim 1 wherein the fastener is moved by a motorized gun including a stepper motor or servo motor.

18. The drawn arc fastener welding process of claim 1 wherein a welding power source is a switch-mode power supply controlled by microprocessor.

19. The drawn arc fastener welding process of claim 1 wherein the fastener includes a reduced sized portion and a larger portion.

20. The drawn arc fastener welding process of claim 19 wherein the reduced sized portion is formed as a cork screw like formation.

21. The drawn arc fastener welding process of claim 19 wherein the reduced sized portion is formed of a different material than the larger portion.

22. The drawn arc fastener welding process of claim 19 wherein said fastener is welded at a lower weld current relative to weld current for a conventional fastener having a uniform diameter.

23. The drawn arc fastener welding process of claim 19 wherein the reduced sized portion includes a corkscrew-like formation.

24. The drawn arc fastener welding process of claim 19 wherein the reduced sized portion is formed as a cylindrical portion.

25. The drawn arc fastener welding process of claim 19 wherein the reduced sized portion is on a weld end of said fastener.

26. The drawn arc fastener welding process of claim 1 wherein the fastener is welded to a dissimilar work piece material wherein the welding process improves the ductility of a weld.

27. The drawn arc fastener welding process of claim 1 wherein the fastener is welded to a carbon content work piece material and wherein the welding process reduces the weld hardness and propensity to hydrogen embrittlement of a weld and eliminates preheating.

28. The drawn arc fastener welding process of claim 1 wherein the fastener includes a galvanized coating and the cyclically redrawing an arc and short circuiting the fastener relative to the work piece allows zinc vapor adequate time to escape and resulting in stronger weld.

29. The drawn arc fastener welding process of claim 28 where the zinc spatter is reduced from reduced current in liquid bridge formation and breaking.

30. The drawn arc fastener welding process of claim 1 wherein the fastener is wet-welded underwater and wherein the welding process reduces the weld hardness and porosity of a weld.

31. A drawn arc fastener welding process comprising the steps of:
   contacting the fastener against the work piece;
   energizing a pilot current;
   lifting the fastener from the work piece and drawing a pilot arc until a positive threshold value of the time derivative of the arc voltage is detected;
   energizing a main arc for a predetermined duration forming a liquid weld pool in the work piece;
   short circuiting the fastener to the weld pool;
   cyclically redrawing an arc and short circuiting the fastener to the weld pool at least one additional cycle wherein the step of cyclically redrawing an arc and short circuiting includes reducing an arc current to a value less than the main arc current when short circuiting and increasing the reduced arc current to the main arc current following the short circuit and a lifting of the fastener relative to the work piece;
   dynamically sensing an arc voltage and calculating a time derivative signal of the arc voltage for each drawn arc and short circuit of the cycle in order to control the lifting of the fastener relative to the weld pool until a positive lift threshold value of the time derivative of the arc voltage is detected during lifting and alternatively control the distance that the fastener travels during plunging until a negative plunge threshold value of the time derivative of the arc voltage is detected; and
   plunging the fastener toward the work piece until the negative plunge threshold value of the time derivative of the arc voltage is detected forming a weld.

32. In a drawn arc welding process in which an arc is formed between a fastener and a work piece, the improvement comprising:
   dynamically controlling the position of the fastener relative to a weld pool formed on the work piece relative to the work piece as a function of the time derivative of the arc voltage so that the fastener is lifted until a positive threshold value of time derivative is detected and the fastener is plunged until a negative threshold value of time derivative is detected.

33. The process as recited in claim 32, wherein the position is controlled as a function of the first time derivative of said arc voltage.

34. The process as recited in claim 32, wherein said arc voltage is filtered with a low pass filter before said first time derivative is determined.

* * * * *